Patented May 11, 1943

2,319,094

UNITED STATES PATENT OFFICE 2,319,094

ORGANIC CHEMICAL PRODUCT

Carl E. Truebe, Saybrook, George S. Shahovskoy, Essex, and Joseph Levy, New Haven, Conn., assignors to Ernst Bischoff Company, Inc., Ivoryton, Conn., a corporation of Connecticut No Drawing. Application May 31, 1941, Serial No. 396,166

4 Claims. (Cl. 167—81)

This invention relates to organic chemical products, and more particularly to quinones.

One of the objects is to obtain an improved product of the vitamin-K type having antihemorrhagic and other valuable properties.

A particular object of the invention is to provide a product of this character readily soluble in aqueous media, relatively stable and lending itself to handling and administration to patients without precautions heretofore considered necessary.

As a result of the search for water-soluble compounds having vitamin-K activity, a number of synthetic substances have been developed. These are effective to a degree for the purposes in view, but the present invention contemplates a notable improvement.

For vitamin-K activity, 2-methyl-1,4-naphthoquinone has been accepted as having one of the highest, if not the highest, rating, but its therapeutic use has been restricted by the fact that it has poor solubility in aqueous media. Aqueous solutions containing a maximum of 0.0001 g. per c. c. can be obtained, but such solutions are unstable and must be kept in the refrigerator. Since the average adult dose of 2-methyl-1,4-naphthoquinone is 0.001 gr., which is equivalent to 1000 standard units of vitamin-K activity, the large volume of solution containing this dose makes it impractical for parenteral administration. Oil solutions can be obtained of the desired concentration (0.001 g. per c. c.), but parenteral use of oil solutions is not desirable, and where administered orally, bile salts have to be administered at the same time in order that there may be adequate absorption.

Our experiments with substances of this type have resulted in the discovery of a new quinone product having unimpaired vitamin-K activity and capable of use in stable aqueous solutions. In the preferred form the product is an addition compound or complex of 2-methyl-1,4-naphthoquinone and sodium salicylate, with the latter compound in large excess, this material being in the form of a solution or powder and being suitable for parenteral as well as oral administration.

As a specific example of the procedure and product falling within the broad principles of our invention, we give the following:

500 g. sodium salicylate is dissolved in 500 c. c. water and 5.0 g. 2-methyl-1,4-naphthoquinone is added. Solution takes place readily at room temperature with stirring or shaking, and a deep orange solution is obtained. Dilution to 1000 c . c. with water results in a concentration of 0.005 g. of 2-methyl-1,4-naphthoquinone per c. c., which is equivalent to 5000 standard units of vitamin-K per c. c. This solution may be diluted to any desired concentration without precipitation, or it may be evaporated to dryness in vacuo at 50°-60° C. without decomposition.

The large excess of sodium salicylate is necessary to prevent the 2-methyl-1,4-napthoquinone from precipitating. The ratio of 100 parts by weight of sodium salicylate to one part of 2-methyl-1,4-naphthoquinone gives solutions which are stable indefinitely at all concentrations under ordinary conditions of storage and use. Solutions containing as low a proportion as 75 parts to one can be readily prepared, but are not stable at all dilutions.

Concentrated solutions can be evaporated to dryness in vacuo at 50°-60° C. without decomposition. The residue thus obtained is suitable for the preparation of tablets.

As addition of the sodium salicylate to the 2-methyl-1,4-naphthoquinone in water deepens color, it is believed that a complex is formed, but we have been unable to isolate the pure complex.

We have made tests relative to the toxicity of these solutions, and the toxicity is found to be low, being of the same order as the toxicity of solutions of pure sodium salicylate of the same concentration. Because of the antiseptic properties of sodium salicylate, the solutions are essentially sterile, but as an additional precaution they may be heated for twelve hours at 60° C. without decomposition.

The great advantage of the new preparation from a medicinal standpoint is its combination of high vitamin-K activity with ready solubility in water. This enables the solution to be administered by injection intravenously, intramuscularly or subcutaneously, in those cases where rapid absorption is imperative. The preparation can also be administered, of course, by mouth, where again water solubility aids in absorption.

Potassium or ammonium salicylate or other water-soluble salicylate may be substituted for sodium salicylate. For medicinal purposes sodium salicylate is the preferred substance.

We have also found that 2-methyl-1,4-naphthohydroquinone exhibits somewhat increased solubility and stability when dissolved in sodium salicylate solution and similar solutions, such as above mention, but it is inferior to 2-methyl-1,4-naphthoquinone.

While we have described a preferred procedure, it will be understood that considerable modification and variation may be made within the spirit of the invention and the scope of the claims.

What we claim is:

1. A new product containing a member of the group consisting of 2-methyl-1,4-naphthoquinone and 2-methyl-1,4-naphthohydroquinone, and a water-soluble salicylate, the ratio of the salicylate to the other constituent referred to being at least 75 parts to one by weight.

2. A new product having vitamin K activity, containing sodium salicylate and 2-methyl-1,4-naphthoquinone in ratio of at least 75 parts to one by weight.

3. A new product having vitamin K activity, the same being a water-soluble powder containing sodium salicylate and 2-methyl-1,4-naphthoquinone in ratio of at least 75 parts to one by weight.

4. As a new product, a stable aqueous solution of 2-methyl-1,4-naphthoquinone suitable for parenteral and oral use containing sodium salicylate and 2-methyl-1,4-naphthoquinone in ratio of at least 75 parts to one by weight.

CARL E. TRUEBE.
GEORGE S. SHAHOVSKOY.
JOSEPH LEVY.